US006562895B2

(12) United States Patent
Blok et al.

(10) Patent No.: US 6,562,895 B2
(45) Date of Patent: *May 13, 2003

(54) LIQUID ISOPRENE-BUTADIENE RUBBER

(75) Inventors: Edward John Blok, Wadsworth, OH (US); Mark Leslie Kralevich, Jr., Copley, OH (US); Paul Harry Sandstrom, Tallmadge, OH (US); Wen-Liang Hsu, Cuyahoga Falls, OH (US); Adel Farhan Halasa, Bath, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 252 days.

This patent is subject to a terminal disclaimer.

(21) Appl. No.: 09/727,175

(22) Filed: Nov. 30, 2000

(65) Prior Publication Data

US 2001/0000516 A1 Apr. 26, 2001

Related U.S. Application Data

(63) Continuation-in-part of application No. 09/249,470, filed on Feb. 12, 1999, now Pat. No. 6,204,320.

(51) Int. Cl.$^7$ ................................................ C08J 27/00

(52) U.S. Cl. .................... 524/534; 526/348.6; 152/450; 152/525

(58) Field of Search ...................... 524/534; 526/348.6; 152/450, 525

(56) References Cited

U.S. PATENT DOCUMENTS 5,137,998 A * 8/1992 Hsu et al. .................... 526/174

* cited by examiner

*Primary Examiner*—Peter D. Mulcahy
(74) *Attorney, Agent, or Firm*—Alvin T. Rockhill

(57) ABSTRACT

The subject invention discloses a liquid isoprene-butadiene rubber (IBR) which is particularly valuable for use in making treads for high performance automobile tires, including race tires, that exhibit superior dry traction characteristics and durability. The isoprene-butadiene rubber of this invention is a liquid at room temperature and is comprised of repeat units which are derived from about 5 weight percent to about 95 weight percent isoprene and from about 5 weight percent to about 95 weight percent 1,3-butadiene, wherein the repeat units derived from isoprene and 1,3-butadiene are in essentially random order. The IBR of this invention also has a low number average molecular weight which is within the range of about 3,000 to about 50,000 and has a glass transition temperature which is within the range of about −50° C. to about 20° C. This invention more specifically discloses a tire tread compound which is comprised of (a) a rubbery elastomer, (b) about 20 phr to about 80 phr of an aromatic process oil, (c) about 35 phr to about 130 phr of a filler and (d) about 4 phr to about 40 phr of a liquid isoprene-butadiene rubber having a number average molecular weight which is within the range of about 3,000 to about 50,000, a glass transition temperature which is within the range of about −50° C. to about 20° C., and wherein the liquid isoprene-butadiene polymer exhibits only one glass transition temperature.

20 Claims, No Drawings

US 6,562,895 B2

LIQUID ISOPRENE-BUTADIENE RUBBER

This is a continuation-in-part of U.S. patent application Ser. No. 09/249,470, filed on Feb. 12, 1999, now U.S. Pat. No. 6,204,320.

BACKGROUND OF THE INVENTION

It is important for high performance tires and race tires to have excellent traction characteristics. In fact, race drivers frequently attribute winning or losing automobile races to their tires. For instance, superior dry traction characteristics allow drivers to go faster, giving them an edge over other drivers having tires that exhibit inferior traction characteristics. Durability can also be important in racing. For example, it is highly advantageous for a set of tires to be durable enough to finish a race without being replaced which, of course, eliminates the need for changing tires during a pit stop. It is, of course, always advantageous for high performance automobile tires to have good durability for increased tire life.

Tire tread compounds for race tires and high performance tires are formulated to attain the best possible combination of traction characteristics and durability. The traditional problem associated with this approach is that traction characteristics and skid resistance characteristics are generally compromised to attain better durability. In order to balance these two inconsistent properties, mixtures of various types of synthetic and natural rubber are normally utilized in high performance tire treads. For instance, various mixtures of styrene-butadiene rubber and polybutadiene rubber are commonly used as a rubbery material for high performance automobile tire treads. High levels of aromatic processing oils are also normally included in high performance tire tread formulations to increase dry traction characteristics (see U.S. Pat. No. 4,861,131). However, high levels of aromatic oils in tread compounds typically reduce the durability of the tire. Thus, the ability to improve the traction characteristics of a tire tread without sacrificing durability is often elusive.

U.S. Pat. No. 4,843,120 discloses that tires having improved performance characteristics can be prepared by utilizing rubbery polymers having multiple glass transition temperatures as the tread rubber. These rubbery polymers having multiple glass transition temperatures exhibit a first glass transition temperature which is within the range of about −110° C. to −20° C. and exhibit a second glass transition temperature which is within the range of about −50° C. to 0° C. According to U.S. Pat. No. 4,843,120, these polymers are made by polymerizing at least one conjugated diolefin monomer in a first reaction zone at a temperature and under conditions sufficient to produce a first polymeric segment having a glass transition temperature which is between −110° C. and −20° C. and subsequently continuing said polymerization in a second reaction zone at a temperature and under conditions sufficient to produce a second polymeric segment having a glass transition temperature which is between −20° C. and 20° C. Such polymerizations are normally catalyzed with an organolithium catalyst and are normally carried out in an inert organic solvent.

U.S. Pat. No. 5,137,998 discloses a process for preparing a rubbery terpolymer of styrene, isoprene and butadiene having multiple glass transition temperatures and having an excellent combination of properties for use in making tire treads which comprises: terpolymerizing styrene, isoprene and 1,3-butadiene in an organic solvent at a temperature of no more than about 40° C. in the presence of (a) at least one member selected from the group consisting of tripiperidino phosphine oxide and alkali metal alkoxides and (b) an organolithium compound.

U.S. Pat. No. 5,047,483 discloses a pneumatic tire having an outer circumferential tread where said tread is a sulfur-cured rubber composition comprised of, based on 100 parts by weight rubber (phr), (A) about 10 to about 90 parts by weight of a styrene, isoprene, butadiene terpolymer rubber (SIBR) and (B) about 70 to about 30 weight percent of at least one of cis 1,4-polyisoprene rubber and cis 1,4-polybutadiene rubber wherein said SIBR rubber is comprised of (1) about 10 to about 35 weight percent bound styrene, (2) about 30 to about 50 weight percent bound isoprene and (3) about 30 to about 40 weight percent bound butadiene and is characterized by having a single glass transition temperature (Tg) which is in the range of about −10° C. to about −40° C. and, further, the said bound butadiene structure contains about 30 to about 40 percent 1,2-vinyl units, the said bound isoprene structure contains about 10 to about 30 percent 3,4-units, and the sum of the percent 1,2-vinyl units of the bound butadiene and the percent 3,4-units of the bound isoprene is in the range of about 40 to about 70 percent.

U.S. Pat. No. 5,272,220 discloses a styrene-isoprene-butadiene rubber which is particularly valuable for use in making truck tire treads which exhibit improved rolling resistance and tread wear characteristics, said rubber being comprised of repeat units which are derived from about 5 weight percent to about 20 weight percent styrene, from about 7 weight percent to about 35 weight percent isoprene and from about 55 weight percent to about 88 weight percent 1,3-butadiene, wherein the repeat units derived from styrene, isoprene and 1,3-butadiene are in essentially random order, wherein from about 25 percent to about 40 percent of the repeat units derived from the 1,3-butadiene are of the cis-microstructure, wherein from about 40 percent to about 60 percent of the repeat units derived from the 1,3-butadiene are of the trans-microstructure, wherein from about 5 percent to about 25 percent of the repeat units derived from the 1,3-butadiene are of the vinyl-microstructure, wherein from about 75 percent to about 90 percent of the repeat units derived from the isoprene are of the 1,4-microstructure, wherein from about 10 percent to about 25 percent of the repeat units derived from the isoprene are of the 3,4-microstructure, wherein the rubber has a glass transition temperature which is within the range of about −90° C. to about −70° C., wherein the rubber has a number average molecular weight which is within the range of about 150,000 to about 400,000, wherein the rubber has a weight average molecular weight of about 300,000 to about 800,000 and wherein the rubber has an inhomogeneity which is within the range of about 0.5 to about 1.5.

U.S. Pat. No. 5,405,927 discloses a pneumatic truck tire having an outer circumferential tread wherein said tread is a sulfur-cured rubber composition comprised of, based on 100 parts by weight of rubber, (a) from about 25 to about 75 parts of an isoprene-butadiene rubber, said rubber being comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3 percent to about 10 percent of the repeat units in said rubber are 1,2-polybutadiene units, wherein from about 50 percent to about 70 percent of the repeat units in said rubber are 1,4-polybutadiene units, wherein from about 1 percent to about 4 percent of the repeat units in said rubber are 3,4-polyisoprene units, wherein from about 25 percent to about 40 percent of the repeat units in the polymer are 1,4-polyisprene units, wherein the rubber has a glass transition temperature which is within the range of about −90° C. to about −75° C. and wherein the rubber has a Mooney viscosity which is within the range of about 55 to about 140; and (b) from about 25 to about 75 parts of natural rubber.

SUMMARY OF THE INVENTION

The traction characteristics of high performance tires and race tires can be improved without compromising durability by utilizing the technique of this invention. This approach involves substituting about 4 phr (parts per hundred parts by weight of rubber) to about 40 phr of liquid isoprene-butadiene rubber for a portion of the aromatic oil included in the tread rubber formulation. The liquid isoprene-butadiene rubber employed in the tread rubber formulations of this invention typically has a number average molecular weight which is within the range of about 3,000 to about 50,000 and a glass transition temperature which is within the range of about −50° C. to about 20° C. The tire tread rubber compounds of this invention will also normally contain about 20 phr to about 80 phr of an aromatic process oil and about 35 phr to about 130 phr of a filler.

This invention more specifically discloses a liquid isoprene-butadiene polymer which is comprised of repeat units which are derived from about 5 weight percent to about 95 weight percent isoprene and from about 5 weight percent to about 95 weight percent 1,3-butadiene, wherein the repeat units derived from isoprene and 1,3-butadiene are in essentially random order, wherein the liquid isoprene-butadiene polymer has a low number average molecular weight which is within the range of about 3,000 to about 50,000 and wherein the liquid isoprene-butadiene polymer has a glass transition temperature which is within the range of about −50° C. to about 20° C.

The subject invention further reveals a tire tread compound which is comprised of (a) a rubbery elastomer, (b) about 20 phr to about 80 phr of an aromatic process oil, (c) about 35 phr to about 130 phr of a filler and (d) about 4 phr to about 40 phr of a liquid isoprene-butadiene rubber having a number average molecular weight which is within the range of about 3,000 to about 50,000 and a glass transition temperature which is within the range of about −50° C. to about 20° C.

The subject invention further reveals a tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; wherein the tread is comprised of (a) a rubbery elastomer, (b) about 20 phr to about 80 phr of an aromatic process oil, (c) about 35 phr to about 130 phr of a filler and (d) about 4 phr to about 40 phr of a liquid isoprene-butadiene rubber having a number average molecular weight which is within the range of about 3,000 to about 50,000 and a glass transition temperature which is within the range of about −50° C. to about 20° C.

DETAILED DESCRIPTION OF THE INVENTION

The IBR of this invention is synthesized by solution polymerization. Such solution polymerizations will normally be carried out in a hydrocarbon solvent which can be one or more aromatic, paraffinic or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In the solution polymerizations of this invention, there will normally be from about 5 to about 35 weight percent monomers in the polymerization medium. Such polymerization media are, of course, comprised of the organic solvent, 1,3-butadiene monomer and isoprene monomer. In most cases, it will be preferred for the polymerization medium to contain from 10 to 30 weight percent monomers. It is generally more preferred for the polymerization medium to contain 20 to 25 weight percent monomer.

The monomer charge compositions utilized in the polymerizations of this invention will typically contain from about 5 weight percent to about 95 weight percent isoprene and from about 5 weight percent to about 95 weight percent 1,3-butadiene monomer. It is more typical for the monomer charge composition to contain from about 20 weight percent to about 80 weight percent isoprene and from about 20 weight percent to about 80 weight percent 1,3-butadiene. In most cases, the monomer charge composition will contain from about 30 weight percent to about 70 weight percent isoprene and from about 30 weight percent to about 70 weight percent 1,3-butadiene.

Since the copolymerization of the 1,3-butadiene monomer and isoprene monomer is normally carried out to a high conversion, the ratio of repeat units in the liquid isoprene-butadiene polymer that are derived from isoprene and 1,3-butadiene will be about the same as was employed in the monomer charge composition. Thus, the liquid isoprene-butadiene polymer will normally contain from about 5 weight percent to about 95 weight percent bound isoprene and from about 5 weight percent to about 95 weight percent bound 1,3-butadiene monomer. The liquid isoprene-butadiene polymer will typically contain from about 20 weight percent to about 80 weight percent bound isoprene and from about 20 weight percent to about 80 weight percent bound 1,3-butadiene monomer. In most cases, the liquid isoprene-butadiene polymer will contain from about 30 weight percent to about 70 weight percent bound isoprene and from about 30 weight percent to about 70 weight percent bound 1,3-butadiene monomer.

The liquid isoprene-butadiene polymer of this invention can be made by a batch process or continuously. It will normally be advantageous to synthesize the isoprene-butadiene polymer on a continuous basis. In such a continuous process, the monomers and an organolithium initiator are continuously fed into a reaction vessel or series of reaction vessels. The pressure in the reaction vessel is typically sufficient to maintain a substantially liquid phase under the conditions of the polymerization reaction. The reaction medium will generally be maintained at a temperature which is within the range of about 20° C. to about 140° C. throughout the copolymerization. The reaction temperature will preferably be within the range of about 40° C. to about 100° C. during the course of the copolymerization. It is generally most preferred for the reaction medium to be maintained at a temperature which is within the range of about 60° C. to 80° C. throughout the copolymerization.

The organolithium compounds which can be utilized as initiators in the copolymerizations of this invention include organomonolithium compounds and organo multifunctional lithium compounds. The organo multifunctional lithium compounds will typically be organodilithium compounds or organotrilithium compounds. Some representative examples of suitable multifunctional organolithium compounds include 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4N-dilithiobiphenyl, and the like.

The organolithium compounds which can be utilized are normally organomonolithium compounds. The organolithium compounds which are preferred can be represented by the formula R—Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium and 4-cyclohexylbutyllithium. The organolithium initiator will typically be an alkyl lithium compound; such as, n-butyl lithium.

The amount of organolithium initiator employed will be dependent upon the molecular weight which is desired for the liquid isoprene-butadiene polymer being synthesized. As a general rule in all anionic polymerizations, the molecular weight of the polymer produced is inversely proportional to the amount of initiator utilized. Since liquid isoprene-butadiene polymer having a relatively low molecular weight is being synthesized, the amount of initiator employed will be relatively large. As a general rule, from about 0.1 to about 2 phm (parts per hundred parts of monomer by weight) of the organolithium compound will be employed. In most cases, it will be preferred to utilize from about 0.2 to about 1 phm of the organolithium compound with it being most preferred to utilize from about 0.4 phm to 0.6 phm of the organolithium compound. In any case, an amount of organolithium initiator will be selected to result in the production of liquid isoprene-butadiene polymer having a number average molecular weight which is within the range of about 3,000 to about 50,000. The amount of organolithium initiator will preferably be selected to result in the production of liquid isoprene-butadiene polymer having a number average molecular weight which is within the range of about 5,000 to about 30,000. The amount of organolithium initiator will most preferably be selected to result in the production of liquid isoprene-butadiene polymer having a number average molecular weight which is within the range of about 8,000 to about 18,000.

It is critical to carry out the copolymerization of 1,3-butadiene and styrene in the presence of a polar modifier, such as N,N,N',N'-tetramethylethylenediamine (TMEDA), to attain a high glass transition temperature which is within the range of about −50° C. to 20° C. It is preferred for the isoprene-butadiene polymer to have a glass transition temperature which is within the range of about −40° C. to about 10° C. It is generally most preferred for the liquid isoprene-butadiene rubber to have a glass transition temperature which is within the range of about −30° C. to about 0° C. Normally, a molar ratio of the polar modified to lithium initiator of at least about 0.5:1 will be utilized to attain the desired glass transition temperature. In most cases, a molar ratio of the polar modified to lithium initiator which is within the range of about 0.5:1 to about 20:1 will be utilized. It is normally preferred to use a molar ratio of the polar modified to lithium initiator which is within the range of about 1:1 to about 10:1. It is typically preferred to employ a molar ratio of the polar modified to lithium initiator which is within the range of about 1.4:1 to about 4:1. It is normally more preferred to employ a molar ratio of the polar modified to lithium initiator which is within the range of about 1.6:1 to about 2:1.

Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine and the like. Dipiperidinoethane, dipyrrolidinoethane, tetramethylethylene diamine, diethylene glycol, dimethyl ether, TMEDA and tetrahydrofuran are representative of highly preferred modifiers. U.S. Pat. No. 4,022,959 describes the use of ethers and tertiary amines as polar modifiers in greater detail.

The isoprene-butadiene polymer produced by the copolymerization is recovered from the organic solvent after the desired monomer conversion has been attained. The isoprene-butadiene polymer can be recovered from the organic solvent by standard techniques. It is normally desirable to precipitate the isoprene-butadiene polymer from the organic solvent by the addition of lower alcohols containing from 1 to about 4 carbon atoms to the polymer solution. Suitable lower alcohols for precipitation of the isoprene-butadiene rubber from the polymer cement include methanol, ethanol, isopropyl alcohol, n-propyl alcohol and t-butyl alcohol. The utilization of lower alcohols to precipitate the liquid isoprene-butadiene rubber from the polymer cement also "kills" the living polymer chains by inactivating lithium end groups. After the isoprene-butadiene polymer is recovered from the organic solvent, steam-stripping can be employed to reduce the level of volatile organic compounds in the polymer.

The repeat units derived from isoprene and 1,3-butadiene that are in the liquid isoprene-butadiene rubber are in an essentially random order. The term "random" as used herein means that the repeat units which are derived from isoprene are well dispersed throughout the polymer and are mixed in with repeat units which are derived from 1,3-butadiene. For purposes of this patent, "random" means that over 60 percent of the isoprene in the IBR is present in blocks of three or less repeat units.

The liquid isoprene-butadiene rubber will exhibit only one glass transition temperature that will be within the range of about −50° C. to 20° C. It is preferred for the isoprene-butadiene polymer to have its glass transition temperature at a temperature that is within the range of about −40° C. to about 10° C. It is generally most preferred for the liquid isoprene-butadiene rubber to have its glass transition temperature which is within the range of about −30° C. to about 0° C. In any case, the liquid isoprene-butadiene polymer of this invention does not exhibit multiple glass transition temperatures. The liquid isoprene-butadiene rubber has a single glass transition temperature that occurs within the range of about −50° C. to 20° C.

For purposes of this patent application, polymer microstructures are determined by nuclear magnetic resonance spectrometry (NMR). Glass transition temperatures are determined by differential scanning calorimetry at a heating rate of 10° C. per minute and molecular weights are determined by gel permeation chromatography (GPC).

The liquid isoprene-butadiene rubber of this invention is particularly valuable for use in making treads for high performance automobile tires. Such high performance tires will normally include a generally toroidal-shaped carcass-with an outer circumferential tread, two spaced beads, at least one ply extending from bead to bead and sidewalls extending radially from and connecting said tread to said beads. The tread of such tires is, of course, adapted to be ground-contacting. The treads of this invention are comprised of (a) a rubbery elastomer, (b) about 20 phr (parts by weight per 100 parts by weight of the rubbery elastomer) to about 80 phr of an aromatic process oil, (c) about 35 phr to about 130 phr of a filler and (d) about 4 phr to about 40 phr of a liquid isoprene-butadiene polymer of this invention. Such treads provide tires with significantly improved dry traction without sacrificing durability.

In the tire tread formulations of this invention, the liquid isoprene-butadiene polymer is essentially substituted for a portion of the aromatic processing oil normally included in the tread compound. The liquid isoprene-butadiene polymer will be added to the tread formulation in an amount that is within the range of about 4 phr to about 40 phr. In most cases, it is preferred for the liquid isoprene-butadiene polymer to be present in the tread compound in an amount which is within the range of about 5 phr to about 25 phr. The amount of aromatic process oil added to the tread compound will typically be within the range of about 20 phr to about 80 phr. In high performance passenger tire applications, the oil will typically be added in an amount that is within the range of about 20 phr to about 50 phr. In high performance passenger tire applications, the oil will more typically be added in an amount that is within the range of about 30 phr to about 45 phr. In race tire applications, the oil will typically be added in an amount that is within the range of about 50 phr to about 80 phr. In race tire applications, the oil will more typically be added in an amount that is within the range of about 55 phr to about 70 phr.

The rubbery elastomer employed in the tread compound can be any rubber or blend of rubbers that can be used in manufacturing high performance tire treads. For instance, the rubbery elastomer can be natural rubber, emulsion styrene-butadiene rubber, solution styrene-butadiene rubber, styrene-isoprene-butadiene rubber or a mixture thereof Such blends can also contain 3,4-polyisoprene, trans-1,4-polybutadiene or cis-1,4-polybutadiene rubber. In cases where 3,4-polyisoprene, trans-1,4-polybutadiene or cis-1,4-polybutadiene rubber are included in the tread compound, they will generally be employed at a level of less than about 40 phr. For instance, the 3,4-polyisoprene, trans-1,4-polybutadiene or the cis-1,4-polybutadiene can be employed in an amount which is within the range of about 5 phr to about 35 phr. The 3,4-polyisoprene which can be utilized will normally have a 3,4-microstructure content of 55 percent to 80 percent as determined by NMR spectroscopy. The 3,4-polyisoprene will, accordingly, have a cis-1,4-microstructure content which is within the range of 20 percent to 45 percent. The 3,4-polyisoprene will also normally have a glass transition temperature from −25° C. to 10° C. as determined by differential scanning calorimetry at a heating rate of 10° C./minute. The cis-1,4-polybutadiene that can be employed in the tread compound will typically have a cis-1,4-microstructure content of at least about 96 percent as determined by NMR spectroscopy.

In many cases, it is preferred for the rubbery elastomer in the tread compound to be styrene-butadiene rubber. For instance, the tread compound can be made using only styrene-butadiene rubber as the rubbery elastomer. However, the rubbery elastomer can also be a blend of styrene-butadiene rubber with natural rubber, 3,4-polyisoprene, cis-1,4-polybutadiene, trans-1,4-polybutadiene or styrene-isoprene-butadiene rubber. In cases where the styrene-butadiene rubber is blended with another rubbery polymer, the other rubbery polymer will normally be added in an amount that is within the range of about 5 phr to about 40 phr.

The tread compound will also contain at least one filler, such as carbon black and/or silica. Clays and/or talc can be included in the filler to reduce cost. The filler will normally be present in an amount which is within the range of about 35 phr to about 130 phr. In high performance passenger tire applications, the filler will normally be present in an amount which is within the range of about 35 phr to about 70 phr. In race tire applications, the filler will normally be present in an amount that is within the range of about 70 phr to about 130 phr. The tread compound can also contain one or more resins, such as, coumarone-indene resin. The resin will normally be added in an amount that is within the range of about 5 phr to about 60 phr in race tire applications. In passenger tire applications, the resin will typically be added in an amount that is within the range of 0 phr to about 20 phr. In passenger tire applications, it is typically preferred for the tread compound not to contain any resin.

The liquid isoprene-butadiene polymer containing blends of this invention can be compounded utilizing conventional ingredients and standard techniques. For instance, the liquid isoprene-butadiene polymer containing rubber compound will typically also include sulfur, accelerators, waxes, scorch inhibiting agents and processing aids. In most cases, the tread rubber formulation will be compounded with sulfur and/or a sulfur containing compound, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

The blend will also normally include from 0.1 to 2.5 phr of at least one accelerator with 0.2 to 1.5 phr being preferred. Antidegradants, such as antioxidants and antiozonants, will generally be included in the blend in amounts ranging from 0.25 to 10 phr with amounts in the range of 1 to 5 phr being preferred. The liquid isoprene-butadiene polymer containing blends of this invention will also normally contain from 0.5 to 10 phr of zinc oxide with 1 to 5 phr being preferred. These blends can optionally contain from 0 to 30 phr of tackifier resins, 0 to 10 phr of reinforcing resins, 1 to 10 phr of fatty acids, 0 to 2.5 phr of peptizers and 0 to 1 phr of scorch inhibiting agents.

The liquid isoprene-butadiene rubber containing tread rubber compounds of this invention can be used in tire treads in conjunction with ordinary tire manufacturing techniques. In other words, tires can be built utilizing standard procedures with the liquid isoprene-butadiene rubber simply being substituted for a portion of the aromatic oil normally included in the tread rubber compound. After the tire has been built, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.).

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

In this experiment, 2240 g of a silica/alumina/molecular sieve dried premix containing 19.7 weight percent of a 1,3-butadiene/isoprene mixture in hexanes was charged into a one-gallon (3.8 liter) reactor. The ratio of 1,3-butadiene to isoprene was 70:30. After the impurity level was determined to be 2 ppm, 8.4 ml of neat N,N,N',N'-tetramethylethylene diamine (TMEDA) and 35 ml of a 1.6 M solution of n-butyllithium (n-BuLi) in hexanes were added to the reactor. The molar ratio of TMEDA to n-BuLi was 1:1 and the target number averaged molecular weight was 8,000.

The polymerization was carried out at 65° C. for 15 minutes. The GC analysis of the residual monomers contained in the polymerization mixture indicated that the polymerization was completed. Then, 3.5 ml of neat ethanol was added to shortstop the polymerization and polymer was removed from the reactor and stabilized with 1 phm of antioxidant. After evaporating the hexanes solvent, the resulting polymer was dried in a vacuum oven at 50° C.

The isoprene-butadiene copolymer produced was determined to have a glass transition temperature (Tg) at −29° C. It was also determined to have a microstructure which contained 45 percent 1,2-polybutadiene units, 19 percent 1,4-polybutadiene units, 9 percent 1,2-polyisoprene units, 7 percent 1,4-polyisoprene units and 20 percent 3,4-polyisoprene units.

EXAMPLE 2–5

The procedure described in Example 1 was utilized in these examples except that the 1,3-butadiene to isoprene ratio and TMEDA/n-BuLi ratio was varied. The butadiene/isoprene ratio (Bd/I) and TMEDA/n-butyl lithium ratio employed in each of the examples are shown in Table I. The glass transition temperature of each of the polymers produced is also shown in Table I.

TABLE I

| Example | Bd/I | TMEDA/n-BuLi | Tg |
|---|---|---|---|
| 1 | 70/30 | 1/1 | −29° C. |
| 2 | 70/30 | 0.5/1 | −39° C. |
| 3 | 50/50 | 0.75/1 | −24° C. |
| 4 | 30/70 | 0.5/1 | −32° C. |
| 5 | 30/70 | 0.7/1 | −15° C. |

The microstructure of the liquid isoprene-butadiene rubbers made are shown in Table II.

TABLE II

| Example | 1,2-PBd | 1,4-PBd | 1,2-PI | 1,4-PI | 3,4-PI |
|---|---|---|---|---|---|
| 1 | 45% | 19% | 9% | 7% | 20% |
| 2 | 42% | 23% | 5% | 12% | 18% |
| 3 | 33% | 14% | 9% | 12% | 32% |
| 4 | 19% | 10% | 5% | 29% | 37% |
| 5 | 20% | 8% | 11% | 16% | 45% |

EXAMPLE 6

In this experiment, liquid isoprene-butadiene rubber having a number average molecular weight of about 16,000 was synthesized in a reactor having a capacity of 500 gallons (1893 liters). In the procedure used, 48 pounds (17.9 kg) of isoprene and 112 pounds (41.8 kg) of 1,3-butadiene were mixed with 1840 pounds (686.7 kg) of polymerization grade hexanes in a premix tank. The monomer premix solution made had a monomer concentration of 8 percent. The monomer premix solution at a temperature of 70° F. (21° C.) was then passed over a silica gel bed at a liquid hour space velocity (LHSV) of about 1 hour to remove tertiary-butyl catechol inhibitor, water and any other polar materials that might have been present. The monomer solution was then charged into the polymerization reactor and heated to a temperature of 100° F. (38° C.). After the monomer solution had been charged into the reactor, 2.478 pounds (925 g) of TMEDA was introduced into the reactor. The contents of the reactor were then agitated for approximately 5 minutes prior to the addition of 0.68301 pounds (254.8 g) of n-butyl lithium initiator. The level of n-butyl lithium initiator was about 0.43 pounds (160.5 g) per 100 pounds (37.3 kg) of monomer. The polymerization reaction was completed in about 5 minutes. However, the polymerization mixture in the reactor was agitated for an additional 25 minutes.

An antioxidant solution was made by charging 3.97 pounds (1.5 kg) of a 30 percent Wingstay® K antioxidant in a hexane solution into a desolventizer tank. The antioxidant solution was made by mixing 1.19 pounds (444.1 g) of the Wingstay® K antioxidant into 2.78 pounds (1037 g) of hexane at a temperature of 70° F. (21° C.). A 10 percent shortstop solution was also made by mixing 1.174 pounds (438.1 g) of rosin acid into 10.223 pounds (3.8 kg) of hexane at a temperature of 700 (21° C.). The shortstop solution was charged into the desolventizer tank with care being taken to keep the desolventizer tank free of oxygen. It should be noted that rosin acid is generally not regarded as being an extremely effective shortstop. However, dissolved water was present in the stream and the water was probably responsible for much of the termination. In any case, rosin acid does impart favorable properties in end use applications and this was the primary reason that it was used.

The live polymer cement was charged into the antioxidant/shortstop heel in the desolventizer tank. Once transfer was complete, the cement was slowly heated by a jacket glycol loop to establish a strong flow of solvent from an overhead condenser. Desolventization was continued with agitation until the concentrated polymer solution was below the agitator blade. At this point, a nitrogen sparge was introduced to the polymer cement to strip off remaining solvent and to assist in removal of the TMEDA to avoid a strong amine odor in the product. When the solids analysis reached about 99 percent, the polymer heel was dropped hot into drums. The temperature at the end of the stripping step was about 210° F. (99° C.). It should be noted that the polymer became rather viscous and difficult to remove from the vessel if allowed to cool much below 210° F. (99° C.).

EXAMPLE 7–10

In this series of experiments, the general procedure described in Example 6 was repeated with the level of n-butyl lithium initiator and TMEDA being adjusted to attain lower molecular weights. The initiator level, TMEDA level and the number average molecular weight (Mn) of the isoprene-butadiene rubbers made is reported in Table III.

TABLE III

| Example | Mn | n-BuLi | TMEDA |
| --- | --- | --- | --- |
| 6 | 16,000 | 0.43 phm | 1.55 phm |
| 7 | 14,000 | 0.46 phm | 1.66 phm |
| 8 | 12,000 | 0.53 phm | 1.93 phm |
| 9 | 10,000 | 0.64 phm | 2.32 phm |
| 10 | 8,000 | 0.80 phm | 2.90 phm |

EXAMPLES 11–14

In this series of experiments, tire tread compounds were made using the liquid isoprene-butadiene rubber of this invention. These tire tread compounds were made by mixing 100 phr of styrene-butadiene rubber, 84.48 phr of carbon black, 29.6 phr of aromatic process oil, 14.4 phr of a liquid isoprene-butadiene rubber having the butadiene/isoprene ratio shown in Table IV, 20.64 phr medium hard coumarone indene resin having a melting point of 100° C., 0.96 phr of stearic acid, 1.2 phr of zinc oxide and 0.67 phr of polymerized 1,2-dihydro-2,2,4-trimethylquinoline for about 2.5 minutes to produce a non-productive compound. The styrene-butadiene rubber employed in these compounds had a glass transition temperature of −16° C., a Mooney ML 1+4 viscosity of about 90, a bound styrene content of 32 percent and a vinyl content of 42 percent. The non-productive compound was then further mixed with 2.4 phr of N-cyclohexyl benzothiazole-2-sulfenamide, 0.206 phr of tetramethylthiuram disulfide and 1.23 phr of rubber makers sulfur in a productive step. The tread rubber compound made in Example 14 was a control and did not contain any liquid isoprene-butadiene rubber. Since the tread rubber compound of Example 14 did not contain the liquid isoprene-butadiene rubber, the level of aromatic process oil was increased to 44 phr.

The cured rubber samples were subsequently evaluated to determine physical characteristics. These physical properties are reported in Table IV.

TABLE IV

| Example | 11 | 12 | 13 | 14 |
| --- | --- | --- | --- | --- |
| Butadiene/Isoprene | 30/70 | 50/50 | 70/30 | — |
| 300% Modulus, MPa | 4.5 | 4.6 | 4.2 | 4.9 |
| Break Strength, MPa | 11.4 | 11.3 | 10.3 | 10.5 |
| Elongation (%) | 643 | 634 | 633 | 579 |
| Energy | 127 | 117 | 115 | 110 |
| Hardness @ RT | 75.5 | 76.4 | 75.2 | 74.5 |
| Hardness @ 100° C. | 44.4 | 44.5 | 44.5 | 45 |
| Rebound @ RT (%) | 9.3 | 9.3 | 9.5 | 8.2 |
| Rebound @ 100° C. (%) | 26.1 | 27.2 | 26.9 | 30.5 |
| DIN Abrasion | 244 | 265 | 265 | 282 |
| G' 50%, kPa* | 427 | 410 | 413 | 438 |
| J" 50% 1/kPa* | 0.54 | 0.59 | 0.57 | 0.5 |

*RPA 100° C., 11 Hz

Typically high performance tires contain high levels of oil to increase dry traction. Generally increasing the oil level increases dry traction (as is exemplified by higher J" values) but reduces the durability (300% Modulus, break strength and energy to break). As can be seen from Table IV, the use of the liquid isoprene-butadiene rubber of this invention in tire tread compounds improves dry traction while maintaining durability. By replacing 14.4 phr of oil with 14.4 phr of the liquid isoprene-butadiene rubbers, the dry traction (J") of the compounds are increased by 8–18 percent. The lab indicator for treadwear (DIN abrasion) shows improvement for all of the liquid isoprene-butadiene polymer containing blends. Thus, durability of all the compounds containing the liquid isoprene-butadiene rubber is equal or improved.

While certain representative embodiments and details have been shown for the purpose of illustrating the subject invention, it will be apparent to those skilled in this art that various changes and modifications can be made therein without departing from the scope of the subject invention.

What is claimed is:

1. A liquid isoprene-butadiene polymer which is comprised of repeat units which are derived from about 5 weight percent to about 95 weight percent isoprene and from about 5 weight percent to about 95 weight percent 1,3-butadiene, wherein the repeat units derived from isoprene and 1,3-butadiene are in essentially random order, wherein the liquid isoprene-butadiene polymer has a low number average molecular weight which is within the range of about 3,000 to about 50,000, wherein the liquid isoprene-butadiene polymer has a glass transition temperature which is within the range of about −50° C. to about 20° C., and wherein the liquid isoprene-butadiene polymer exhibits only one glass transition temperature.

2. A liquid isoprene-butadiene polymer as specified in claim 1 wherein said liquid isoprene-butadiene polymer has a number average molecular weight which is within the range of about 5,000 to about 30,000.

3. A liquid isoprene-butadiene polymer as specified in claim 2 wherein said liquid isoprene-butadiene polymer has a glass transition temperature which is within the range of about −40° C. to about 10° C.

4. A liquid isoprene-butadiene polymer as specified in claim 2 wherein said liquid isoprene-butadiene polymer is comprised of repeat units which are derived from about 20 weight percent to about 80 weight percent isoprene and from about 20 weight percent to about 80 weight percent 1,3-butadiene.

5. A liquid isoprene-butadiene polymer as specified in claim 4 wherein said liquid isoprene-butadiene polymer has a number average molecular weight which is within the range of about 8,000 to about 18,000.

6. A liquid isoprene-butadiene polymer as specified in claim 5 wherein said liquid isoprene-butadiene polymer has a glass transition temperature which is within the range of about −30° C. to about 0° C.

7. A liquid isoprene-butadiene polymer as specified in claim 6 wherein said liquid isoprene-butadiene polymer is comprised of repeat units which are derived from about 30 weight percent to about 70 weight percent isoprene and from about 30 weight percent to about 70 weight percent 1,3-butadiene.

8. A tire tread compound which is comprised of (a) a rubbery elastomer, (b) about 20 phr to about 80 phr of an aromatic process oil, (c) about 35 phr to about 130 phr of a filler and (d) about 4 phr to about 40 phr of a liquid isoprene-butadiene rubber that is comprised of repeat units that are derived from about 5 weight percent to about 95 weight percent isoprene and from about 5 weight percent to about 95 weight percent 1,3-butadiene, wherein the liquid isoprene-butadiene rubber has a number average molecular weight which is within the range of about 3,000 to about 50,000, wherein the liquid isoprene-butadiene rubber has a glass transition temperature which is within the range of about −50° C. to about 20° C., wherein the repeat units in the liquid isoprene-butadiene rubber are in essentially random order, and wherein the liquid isoprene-butadiene polymer exhibits only one glass transition temperature.

9. A tire tread compound as specified in claim 8 wherein the liquid isoprene-butadiene rubber has a glass transition temperature which is within the range of about −50° C. to about 20° C.

10. A tire tread compound as specified in claim 9 wherein the rubbery elastomer is styrene-butadiene rubber.

11. A tire tread compound as specified in claim 10 wherein the liquid isoprene-butadiene rubber has a number average molecular weight which is within the range of about 5,000 to about 30,000; and wherein said liquid isoprene-butadiene rubber has a glass transition temperature which is within the range of about −40° C. to about 10° C.

12. A tire tread compound as specified in claim 11 wherein the liquid isoprene-butadiene rubber is present at a level which is within the range of about 5 phr to about 25 phr.

13. A tire tread compound as specified in claim 12 wherein the oil is present at a level which is within the range of about 20 phr to about 50 phr.

14. A tire tread compound as specified in claim 12 wherein the oil is present at a level which is within the range of about 30 phr to about 45 phr.

15. A tire tread compound as specified in claim 12 wherein the oil is present at a level which is within the range of about 50 phr to about 80 phr.

16. A tire tread compound as specified in claim 15 which is further comprised of a resin.

17. A tire tread compound as specified in claim 16 wherein said resin is present at a level which is within the range of about 5 phr to about 60 phr.

18. A tire tread compound as specified in claim 17 wherein the filler is present at a level which is within the range of about 35 phr to about 70 phr.

19. A tire tread compound as specified in claim 18 wherein the liquid isoprene-butadiene rubber has a number average molecular weight which is within the range of about 8,000 to about 18,000; wherein said liquid isoprene-butadiene rubber has a glass transition temperature which is within the range of about −30° C. to about 0° C.; and wherein said liquid isoprene-butadiene rubber is comprised of repeat units which are derived from about 20 weight percent to about 80 weight percent isoprene and from about 20 weight percent to about 80 weight percent 1,3-butadiene.

20. A tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; wherein the tread is comprised of (a) a rubbery elastomer, (b) about 20 phr to about 80 phr of an aromatic process oil, (c) about 35 phr to about 130 phr of a filler and (d) about 4 phr t rubber that is comprised of repeat units that are derived from about 5 weight percent to about 95 weight percent isoprene and from about 5 weight percent to about 95 weight percent 1,3-butadiene, wherein the liquid isoprene-butadiene rubber has a number average molecular weight which is within the range of about 3,000 to about 50,000, wherein the liquid isoprene-butadiene rubber has a glass transition temperature which is within the range of about −50° C. to about 20° C., wherein the repeat units in the liquid isoprene-butadiene rubber are in essentially random order, and wherein the liquid isoprene-butadiene polymer exhibits only one glass transition temperature.

* * * * *